United States Patent [19]

Olnowich et al.

[11] Patent Number: 5,495,474
[45] Date of Patent: Feb. 27, 1996

[54] SWITCH-BASED MICROCHANNEL PLANAR APPARATUS

[75] Inventors: Howard T. Olnowich, Endwell, N.Y.; Michael H. Fisher, Rochester, Minn.; Robert F. Lusch, Vestal; Michael A. Maniguet, Owego, both of N.Y.; Omar A. Saiyid, Reston, Va.

[73] Assignee: International Business Machines Corp., Armonk, N.Y.

[21] Appl. No.: 946,204

[22] Filed: Sep. 17, 1992

Related U.S. Application Data

[63] Continuation-in-part of Ser. No. 677,543, Mar. 29, 1991, abandoned, Ser. No. 799,497, Nov. 27, 1991, abandoned, and Ser. No. 799,602, Nov. 27, 1991.

[51] Int. Cl.$^6$ ................................................. H04L 12/02
[52] U.S. Cl. .......................... 370/53; 370/79; 370/85.1; 370/91; 340/826; 340/825.8
[58] Field of Search .............................. 370/55, 79, 85.1, 370/91, 60, 94.1, 53, 58.1; 340/826, 825.8

[56] References Cited

U.S. PATENT DOCUMENTS

| | | | |
|---|---|---|---|
| 3,601,546 | 8/1971 | Lee | 179/18 EB |
| 3,800,097 | 3/1974 | Maruscak et al. | 320/68 |
| 4,201,889 | 5/1980 | Lawrence et al. | 370/86 |
| 4,207,609 | 6/1980 | Luiz et al. | 364/200 |
| 4,396,984 | 8/1983 | Videki, II | 364/200 |
| 4,455,605 | 6/1984 | Cormier et al. | 364/200 |
| 4,570,261 | 2/1986 | Maher | 371/16 |
| 4,589,106 | 5/1986 | Prather et al. | 370/58 |
| 4,733,391 | 3/1988 | Godbold et al. | 370/88 |
| 4,736,409 | 4/1988 | Hasegawa et al. | 379/269 |
| 4,747,073 | 5/1988 | Desbois et al. | 395/325 |
| 4,754,395 | 6/1988 | Weisshaar et al. | 364/200 |
| 4,807,282 | 2/1989 | Kazan | 379/284 |
| 4,811,201 | 3/1989 | Rau et al. | 364/200 |
| 4,845,709 | 7/1989 | Matsumoto et al. | 370/86 |
| 4,855,903 | 8/1989 | Carleton et al. | 364/200 |
| 4,858,162 | 8/1989 | Kieffer et al. | 364/708 |
| 4,864,496 | 9/1989 | Triolo et al. | 364/200 |
| 4,873,517 | 10/1989 | Baratz et al. | 340/825.03 |
| 4,896,289 | 1/1990 | Svinicki et al. | 364/900 |
| 4,914,571 | 4/1990 | Baratz et al. | 364/200 |
| 4,932,021 | 6/1990 | Moody | 370/54 |

(List continued on next page.)

FOREIGN PATENT DOCUMENTS

| | | | |
|---|---|---|---|
| 0380851 | 9/1989 | European Pat. Off. | G06F 15/16 |
| 0391583 | 3/1990 | European Pat. Off. | G06F 15/16 |
| 0505695 | 2/1992 | European Pat. Off. | G06F 15/16 |

OTHER PUBLICATIONS

IBM Technical Disclosure Bulletin, vol. 31, No. 6, Nov. 1988, "Transparent Access To Local Or Remote I/O Via Various Channels And/Or Links", pp. 220–227.

"Path Hierarchies In Interconnection Networks", Journal of Research and Development, vol. 31, No. 1, Jan., 1987, by Franaszek.

"Multipath Hierarchies In Interconnection Networks", by Franaszek et al.

IBM TDB vol. 33, No. 5, Oct., 1990, "Asynchronous Digital Video Switching System", by Farrell et al, pp. 227–233.

Primary Examiner—Douglas W. Olms
Assistant Examiner—Russell W. Blum
Attorney, Agent, or Firm—Lynn L. Augspurger; Eugene I. Shkurko

[57] ABSTRACT

A modularly expandable switch-based planar apparatus for insertable multiple bus-based processor cards and/or expansion cards and interconnecting the cards via a multi-stage switch network which resides on the planar apparatus. The cards require no modification or change of any kind, since the connection to the planar apparatus is made as if the planar apparatus contained the standard MicroChannel interconnection. The planar apparatus implements bus converter units to convert the standard bus interface provided by the cards to the switch network interface, so that functions provided by the cards can communicate in parallel over the switch network.

12 Claims, 12 Drawing Sheets

U.S. PATENT DOCUMENTS

| | | | |
|---|---|---|---|
| 4,949,301 | 8/1990 | Joshi et al. | 364/900 |
| 4,952,930 | 8/1990 | Franaszek et al. | 340/825.8 |
| 4,965,788 | 10/1990 | Newman | 370/60 |
| 4,969,083 | 11/1990 | Gates | 364/147 |
| 4,979,097 | 12/1990 | Triolo et al. | 364/200 |
| 5,058,053 | 10/1991 | Gillett | 364/900 |
| 5,123,011 | 6/1992 | Hein et al. | 370/58.1 |
| 5,155,810 | 10/1992 | McNamara et al. | 395/250 |
| 5,163,833 | 11/1992 | Olsen et al. | 439/61 |

SWITCH-BASED MICROCHANNEL PLANAR APPARATUS

RELATED APPLICATIONS

The present United States patent application claims priority as a continuation-in-part application and is related to the following applications:

U.S. Ser. No. 07/677,543, filed Mar. 29, 1991, now abandoned, entitled "All-Node Switch, An Unclocked, Unbuffered Asynchronous Switching Apparatus", by P. A. Franaszek et al., and U.S. Ser. No. 07/799,497, Filed Nov. 27, 1991, now abandoned, entitled "Multi-Function Network" by H. T. Olnowich, et al. and U.S. Ser. No. 07/799,602, Filed Nov. 27, 1991, entitled "Multi-Media Serial Line Switching Adapter for Parallel Networks and Heterogeneous and Homologous Computer Systems", by H. T. Olnowich, et al.

The present application is also related to the following applications filed concurrently herewith:

U.S. Ser. No. 07/947,196, filed Sep. 17, 1992, entitled "Multi-Media Analog/Digital/Optical Switching Apparatus", by H. T. Olnowich et al, and, U.S. Ser. No. 07/946,512, filed Sep. 17, 1992, entitled "Switch-Based Personal Computer Interconnection Apparatus" by H. T. Olnowich et al, and, U.S. Ser. No. 07/947,644, filed Sep. 17, 1992, entitled "Slave MicroChannel Apparatus for Converting to Switch Architecture" by H. T. Olnowich et al, and, U.S. Ser. No. 07/946,506, filed Sep. 17, 1992, entitled "Master MicroChannel Apparatus for Converting to Switch Architecture" by H. T. Olnowich et al, and, U.S. Ser. No. 07/946,203, filed Sep. 17, 1992, entitled "Multipath Torus Switching Apparatus" by H. T. Olnowich et al, and, U.S. Ser. No. 07/946,513, filed Sep. 17, 1992, entitled "Variable Cyclic Redundancy Coding Method and Apparatus" by H. T. Olnowich et al, and, U.S. Ser. No. 07/947,010, filed Sep. 17, 1992, entitled "Signal Regeneration Apparatus for Multi-Stage Transmissions", by H. T. Olnowich et al, and, U.S. Ser. No. 07/947,023, filed Sep. 17, 1992, now issued as U.S. Pat. No. 5,345,229 entitled "Adaptive Switching Apparatus for Multi-Stage Networks", by H. T. Olnowich et al, and, U.S. Ser. No. 07/946,986, filed Sep. 17, 1992, entitled "Priority Interrupt Switching Apparatus for Real Time Systems", by H. T. Olnowich et al, and, U.S. Ser. No. 07/946,509, filed Sep. 17, 1992, entitled "Message Header Generation Apparatus for Parallel Systems" inventors H. T. Olnowich et al.

These applications and the present application are owned by one and the same assignee, International Business Machines Corporation of Armonk, N.Y.

The descriptions set forth in the previous applications and the concurrently filed applications are incorporated by reference.

FIELD OF THE INVENTIONS

The present invention relates to digital computer systems comprised of several or many computing and/or input/output elements, and the ability of the said individual elements to perform high speed, low-latency communications with each other in a parallel fashion over switching networks.

GLOSSARY OF TERMS

Card slots

Receptacle connectors mounted on a planar for the purpose of receiving processor or expansion cards.

Expansion Card

A board of components that function together as a co-processing or I/O element. The card board has multiple wiring planes used to interconnect all components mounted on the board. The card board has a connector element used to connect the card to the planar (usually the card connector is inserted into the planar connector receptacle). The active components on the card usually include a co-processing and/or I/O element, remote memory, and an I/O interface in the form of a multi-drop bus that connects to the planar through the card connector for communication to other processor or I/O cards.

Functional Elements

Any processor or I/O device connected in the form of a processor card or expansion card to the multi-stage network incorporated on the disclosed planar.

I/O Card

Another term for expansion card

MC Converter

A functional converter that converts the standard Micro-Channel bus protocol to the switching network protocol. MicroChannel is a trademark of IBM for the I/O, Multi-drop bus used in most IBM Personal Computers and other machines. The description uses MicroChannel to refer to a multi-drop bus.

MCC

Abbreviation for MC Converter

Node

A functional element of the system comprised of one or more processor and/or expansion cards interconnected by a standard bus, which in turn connects to to the switching network as a single port of the network.

Nodal element

Another term for node, which has the same meaning.

Planar

A interconnection board or motherboard having multiple wiring planes. The planar contains active components, such as a multi-stage switching network, and inactive components, such as connector slots capable of receiving processor or expansion cards. The planar provides the interconnection wiring amongst the said cards.

Port

A single bi-directional entry and exit point to a switching network.

Processor Card

A board of components that function together as a processing element. The card board has multiple wiring planes used to interconnect all components mounted on the board. The card board has a connector element used to connect the card to the planar (usually the card connector is inserted into the planar connector receptacle). The active components on the card usually include a computing element, memory (local and cache), and an I/O interface in the form of a multi-drop bus that connects to the planar through the card connector for communication to other processor or I/O cards.

Receiving Node

A functional element of the system comprised of one or more processor and/or expansion cards interconnected by a standard bus to a switching network, which is receiving data transmitted over the switching network.

Sending Node

A functional element of the system comprised of one or more processor and/or expansion cards interconnected by a standard bus to a switching network, which is transmitting data over the switching network.

BACKGROUND OF THE INVENTIONS

Multi-stage switching networks are gaining acceptance as a means for interconnecting multiple devices within modern digital computing systems. In particular, in parallel systems it is common to use a multi-staged switching network to interconnect N system elements, where N can be several or thousands of processors or combinations of processors and other system elements.

The state-of-the-art interconnection approaches have centered around multi-drop busses, which have many short comings, the primary of which is limited performance and expansion. The problem exists in bus-based processors that there is an ever increasing need for better I/O bus performance and the attachment of more I/O options. This is in direct conflict with the nature of a multi-drop bus technology, which loses performance as more and I/O options are added as taps to the bus. In general, standard bus architectures such as the MicroChannel (IBM Trademark) have selected a performance goal and thus limited the number of I/O taps permissible at that performance level. In the case of the MicroChannel the result is that 8 taps (or expansion cards) is the maximum number of allowable bus taps to permit bus operations to occur at 200 ns cycle times. As a result, bus-based system users are beginning to find that the I/O capability is not sufficient to meet their needs. For years people having been looking for means of increasing the I/O capability of bus-based systems.

Bus-based system performance is limited because only one user can have access to the bus at any given time. The expandability is limited because of the electrical characteristics of the multi-drop bus including drive capability, noise and reflections.

On the other hand, MicroChannel and bus-based machines are relatively inexpensive and constantly increasing in processor performance capabilities. These machines and their expansion cards represent investment dollars, and owners wish to use and build on this investment for many years. The present invention provides a means of using bus-based processor cards and bus-based expansion cards at improved performance and expandability levels by disclosing a new planar interconnection means.

The present invention interconnects multiple bus-based cards by adapting the existing bus interface to allow each card or sets of multiple cards to be interconnected via a high speed switching network. This enables the individual bus-based cards to communicate with low-latency messages and to interact as a parallel system. Now many communications can take place simultaneously in parallel and expansion can be virtually unlimited. This allows for use of investment, yet it overcomes all the limitations placed upon a single bus-based architecture.

Many state-of-the-art switch solutions do not provide the switching network characteristics and low-latency concepts required for modern interconnect systems. The characteristics that are required include the ability to dynamically and quickly establish and break element interconnections, to do it cheaply and easily in one chip, to have expandablity to many thousands of elements, to permit any length, non-calibrated interconnection wire lengths, to solve the distributed clocking problems and allow future frequency increases, and to permit parallel establishment and data transmittal over N switching paths simultaneously.

The distributed and fully parallel switch utilized herein to provide the required interconnect properties is the ALLNODE Switch (Asynchronous, Low Latency, inter-NODE switch), which is disclosed in U.S. Ser. No. 07/677,543 and adapted by the present invention to perform the switching of converted bus interfaces at low latencies and high bandwidths. The ALLNODE switch provides a circuit switching capability at high bandwidths, and includes distributed switch path connection set-up and tear-down controls individually within each switch—thus providing parallel set-up, low latency, and elimination of central point failures. We will further describe in the detailed description a way whereby the ALLNODE switch and the present invention can be used to solve the bus-based processor interconnection problem effectively.

Often systems require multiple paths through multi-stage switching networks to improve performance, provide fault tolerance, and prevent blocking. The ALLNODE Switch invention as disclosed in U.S. Ser. No. 07/677,543, and which is adapted by the present invention provides multiple paths. An earlier work at IBM by Peter Franaszek, as described in his work entitled "Multipath Hierarchies in Interconnection Networks" described two hierarchical paths for a network, one providing low-latency message transfer and the other providing guaranteed-delivery of a message transfer. A message is attempted over the low-latency path first. If the transmission fails due to blocking or contention, it is retransmitted over the guaranteed-delivery path. This allows usually about 90% of the messages to be sent successfully over the low-latency path, and guarantees the delivery of a message that gets blocked on the low-latency path due to retransmissions.

U.S. Pat. No. 4,952,930 to P. A. Franaszek et al. issued Aug. 28, 1990 described the approach which used a second buffered path, which is in some ways similar to the current approach. However, it suffered by its requirements of a plurality of switches to implement it. While there would be no impediment to our adopting the teachings of this patent there remained a need for a simpler and yet more flexible approach to create a multi-stage network.

Multi-stage networks have become an accepted means for interconnecting multiple devices within a computer system. They are a replacement for the traditional crossbar interconnection. The crossbar is still a most efficient method of network interconnection, but it tends to be impractical for large systems. An N×M crossbar permits total simultaneous interconnection, where all the N devices can be communicating simultaneously with different members of the set of M devices. The crossbar is "non-blocking" because their is nothing internal to the crossbar which prevents any given N device from connecting to an M device which is IDLE (is not connected to some other N device). If an N device desires to connect to an M device which is BUSY (previously connected to some other N device), no connection can be made until the previous connection is broken—however, this is referred to as "contention" and is not called "blocking".

When N and M become large (usually greater than 32 or 64) it becomes very unwieldy to build crossbars since there complexity increases at an N×M rate and their pin count increases at an (N×M)×W rate, where W=the number of pins per port. Thus large networks are usually built from multi-stage networks constructed by cascading several stages of smaller crossbars together to provide an expanded network. The disadvantage of multi-stage networks is that they are "blocking", i.e., a connection might not be able to be made to an IDLE M device because there is no path available in the network to provide the necessary connection to the IDLE device.

Among other patents which might be reviewed are: U.S. Pat. No. 4,914,571 to A. E. Baratz et al. issued Apr. 3, 1990 which describes a method of addressing and thus how to find resources attached to a network, but does not deal with the hardware for the actual network itself.

U.S. Pat. No. 4,455,605 to R. L. Cormier et al. issued Jun. 19, 1984 which is for a bus oriented system, it is not a multi-stage network. Similarly, U.S. Pat. No. 4,396,984 to E. R. Videki, II issued Aug. 2, 1983 is for an I/O bus channel, not a multi-stage network. U.S. Pat. No. 4,570,261 to J. W. Maher issued Feb. 11, 1986 is for fault recovery over a bus oriented system, not a multi-stage network.

U.S. Pat. No. 4,207,609 to F. A. Luiz et al. issued Jun. 10, 1980 illustrates an I/O bus channel so that those in the art will understand the differences between the subject matter. It is not a multi-stage network.

U.S. Pat. No. 4,873,517 to A. E. Baratz et al. issued Oct. 10, 1989 is for a totally different type of network, not an equi-distant multi-stage network like that which we will describe, and also, U.S. Pat. No. 4,932,021 to T. S. Moody issued Jun. 5, 1990 for bus wiring paths inside a computer box, it is not a multi-stage network. U.S. Pat. No. 4,733,391 to R. J. Godbold et al. issued Mar. 22, 1988 illustrates a ring interconnection network, which is unlike a multi-stage network. U.S. Pat. No. 4,811,201 to B. R. Rau et al. issued Mar. 7, 1989 are not applicable to a multi-stage network. U.S. Pat. No. 4,754,395 to B. P Weisshaar et al. issued Jun. 28, 1988 is for a ring interconnection network.

SUMMARY OF THE INVENTIONS

The invention is a modularly expandable switch-based planar apparatus for inserting multiple bus-based processor cards and/or expansion cards and interconnecting the said cards via a multi-stage switch network which resides on the invention planar. The multi-stage network is used to interconnect bus-based cards (cards that provide bus interfaces—like MicroChannel cards providing the standard MicroChannel bus and connectors). The switching network is built into the planar.

The cards themselves require no modification or change of any kind, the connection to the planar is made as if the planar contained the standard multi-drop bus interconnection. However, the disclosed planar is a new concept that contains only the point-to-point wiring for interconnecting multiple switch stages, rather than supporting the standard multi-drop bus connections. All processors and expansion cards are still fully interconnected and capable of sending communications or messages between any two elements. The communication media is switch-based and is fully parallel, supporting n transmissions simultaneously, where n is the number of functional elements interconnected by the switching network.

The preferred switching means is the basic digital asynchronous and unbuffered switching concept disclosed in U.S. Ser. No. 07/677,543, "All-Node Switch, An Unclocked, Unbuffered Asynchronous Switching Apparatus" by H. T. Olnowich et al. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple shod messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network would have the characteristics for full parallel interconnection.

DETAILED DESCRIPTION OF THE PREFERRED EMBODIMENTS

Figure 1:
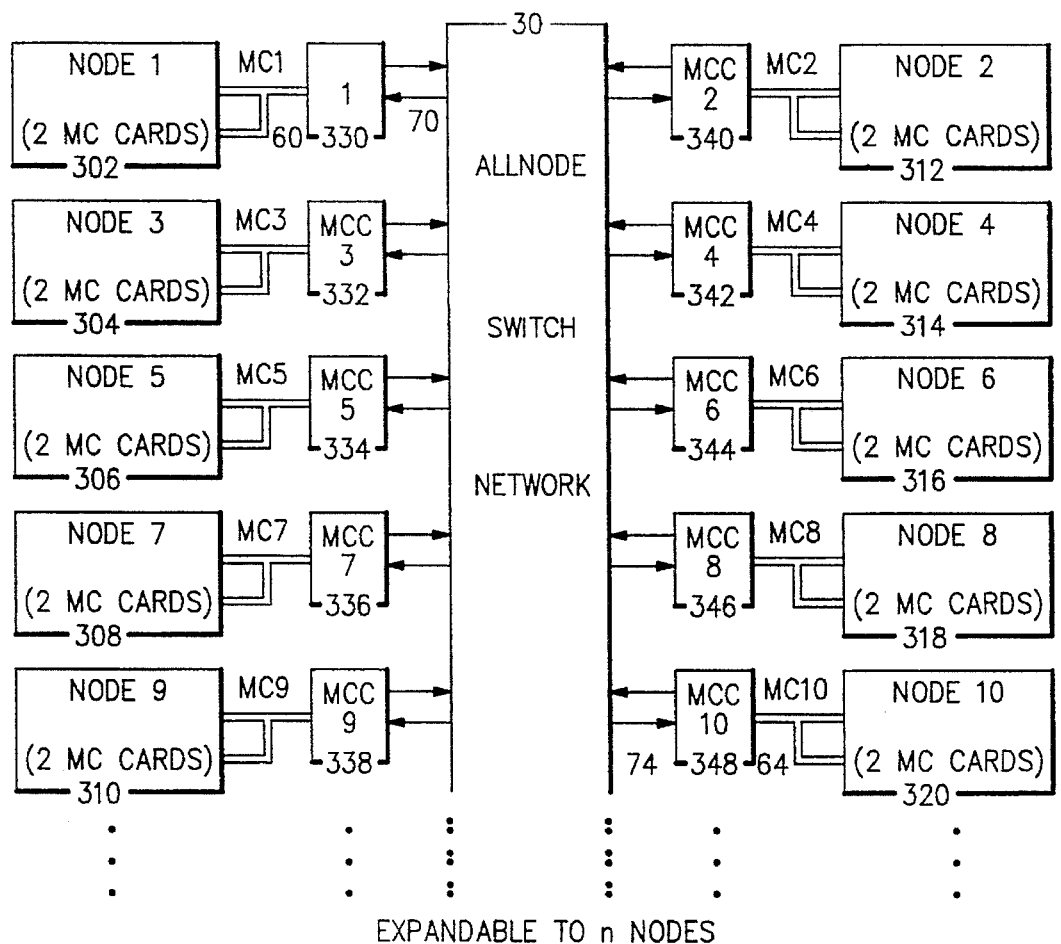
FIG. 1 illustrates generally our preferred embodiment of the present invention of the Switch-based MicroChannel Planar apparatus, which has the capability of interconnecting multiple bus-based processor and/or expansion cards.

Turning now to the drawings in greater detail, FIG. 1, shows the preferred method of interconnecting n nodes via the Switch-based MicroChannel Planar. The entire system is composed of individual nodes (302,304,306,308,310,312, 314,316,318,320,etc.) connected to individual MicroChannel Converter units (MCC's 330,332,334,336,338,340,342, 344, 346,348,etc.), which in turn connect to the switch network 30. A typical node is shown by block 2 as being comprised of 2 MicroChannel Cards (MC CARDS); these cards can be either processor cards or expansion cards in any combination. The number of MicroChannel Cards per node can vary with each individual node and can be composed of from 1 to 8 cards; however, the preferred embodiment shown in FIG. 1 assigns 2 MC CARDS to each node. These MC nodes can either connect as a direct point-to-point wired MicroChannel bus to the associated MCC 330 unit in the case where a node is comprised of only one MC card, or these MC CARDS can connect as a multi-drop MicroChannel bus to the MCC 330 to give the node an increased card count and increased nodal flexibilty. The MicroChannel bus connection of 2 cards per node to a single MCC 330 function is denoted in FIG. 1 as a unique MicroChannel bus labelled MC1 to indicate that it is an entirely different and isolated MicroChannel bus from the other similar MC busses, such as MC2, MC3, etc. In turn, each MCC functional block connects by point-to-point wiring only to switch network 30.

Switch network 30 can be any type of multi-stage, torus, or hypercube network that permits either small or massive expansion by permitting several or massive number of nodes to interconnect. However, the preferred embodiment of the switching means is the basic digital asynchronous and unbuffered switching concept disclosed in U.S. Ser. No. 07/677,543, "All-Node Switch, An Unclocked, Unbuffered Asychronous Switching Apparatus" by H. T. Olnowich et al, which is a unidirectional switch implementation. The preferred embodiment uses only unidirectional interfaces, and therefore FIG. 1 shows the switch interface 70 to be comprised of two unidirectional sets of lines, one carrying data to MCC1 from the switch network, and one carrying data to the switch network from MCC1.

It is here understood that the FIGS. 2 to 8 are illustrations which are common to U.S. Ser. No. 07/677,543, the parent application which is incorporated herein by reference as to all of its contents. FIGS. 2 to 8 refer to a 4×4 crossbar implementation of the ALLNODE Switch to illustrate the principles and speed of the switching concept.

Figure 2:
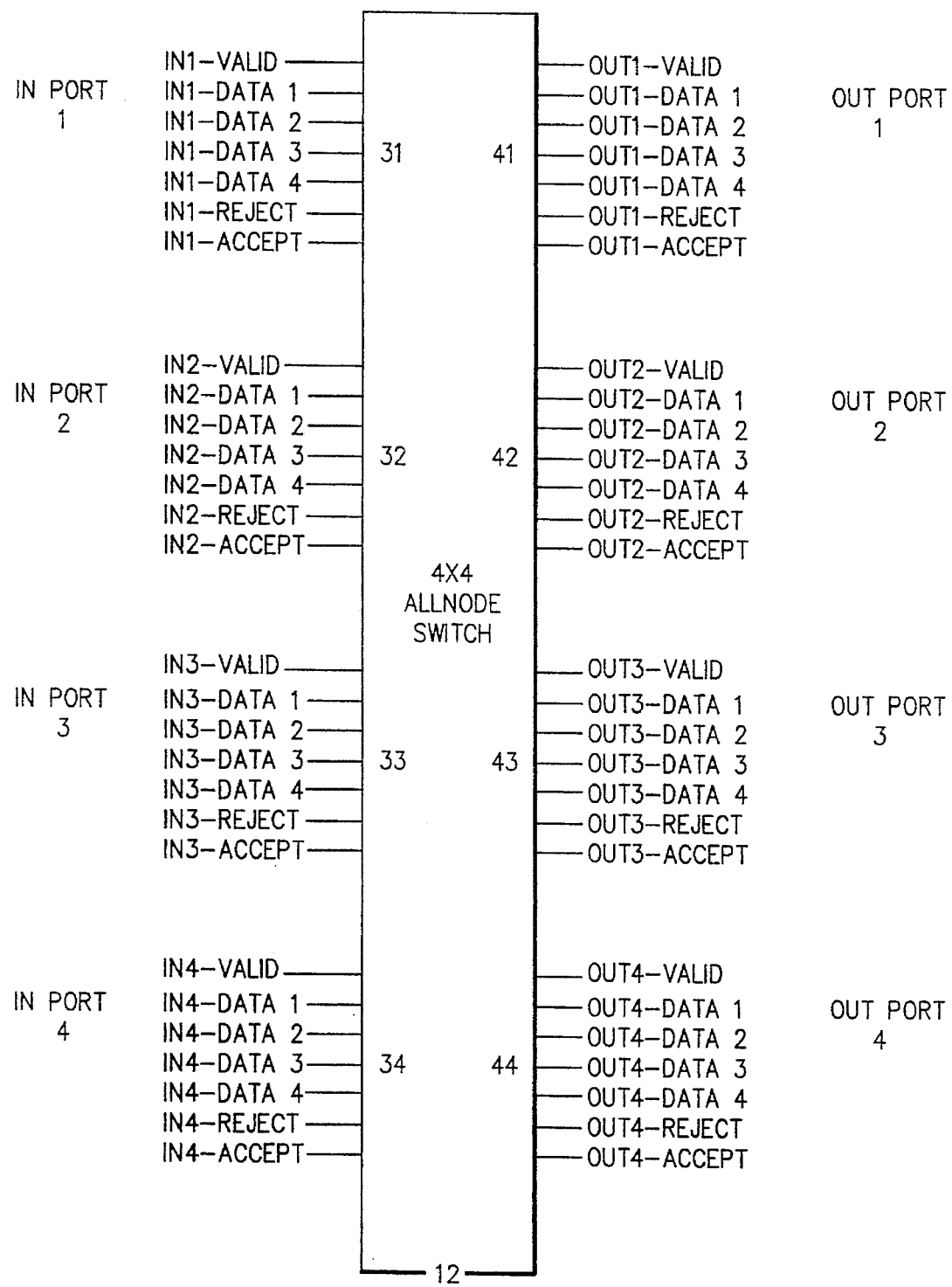
FIG. 2 illustrates a four input and four output (4×4) crossbar switching apparatus, which has the capability of providing the disclosed fully parallel switching means for interconnecting up to four nodes.

Referring to FIG. 2, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 2. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 2, to transmit and control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal. When in the low state, it indicates that a message is in the process of being received and checked for accuracy. When active, it indicates the message has been received correctly.

Figure 3:
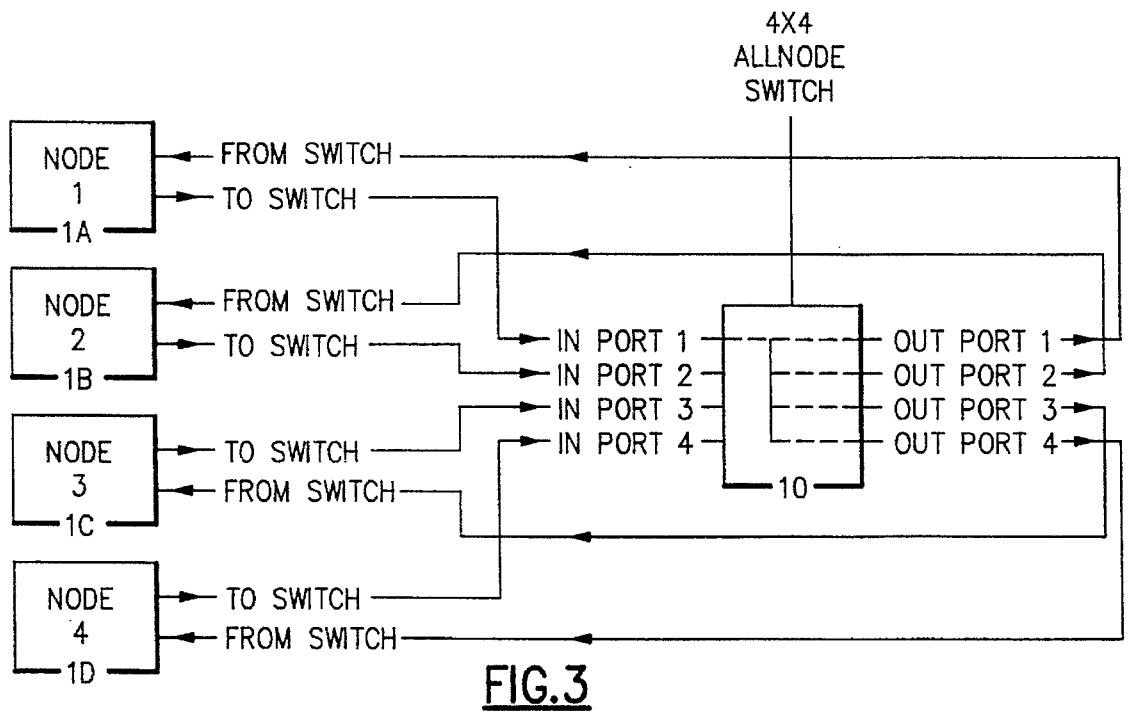
FIG. 3 illustrates the interconnections required to a four input and four output (4×4) crossbar switching apparatus to provide full interconnection amongst four nodes.

As illustrated by FIG. 3 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 3 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (20, 22, 24, and 26) by connecting the 4×4 ALL-NODE switching apparatus 10 as shown in FIG. 3. Each node 20, 22, 24, and 26 has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 4:
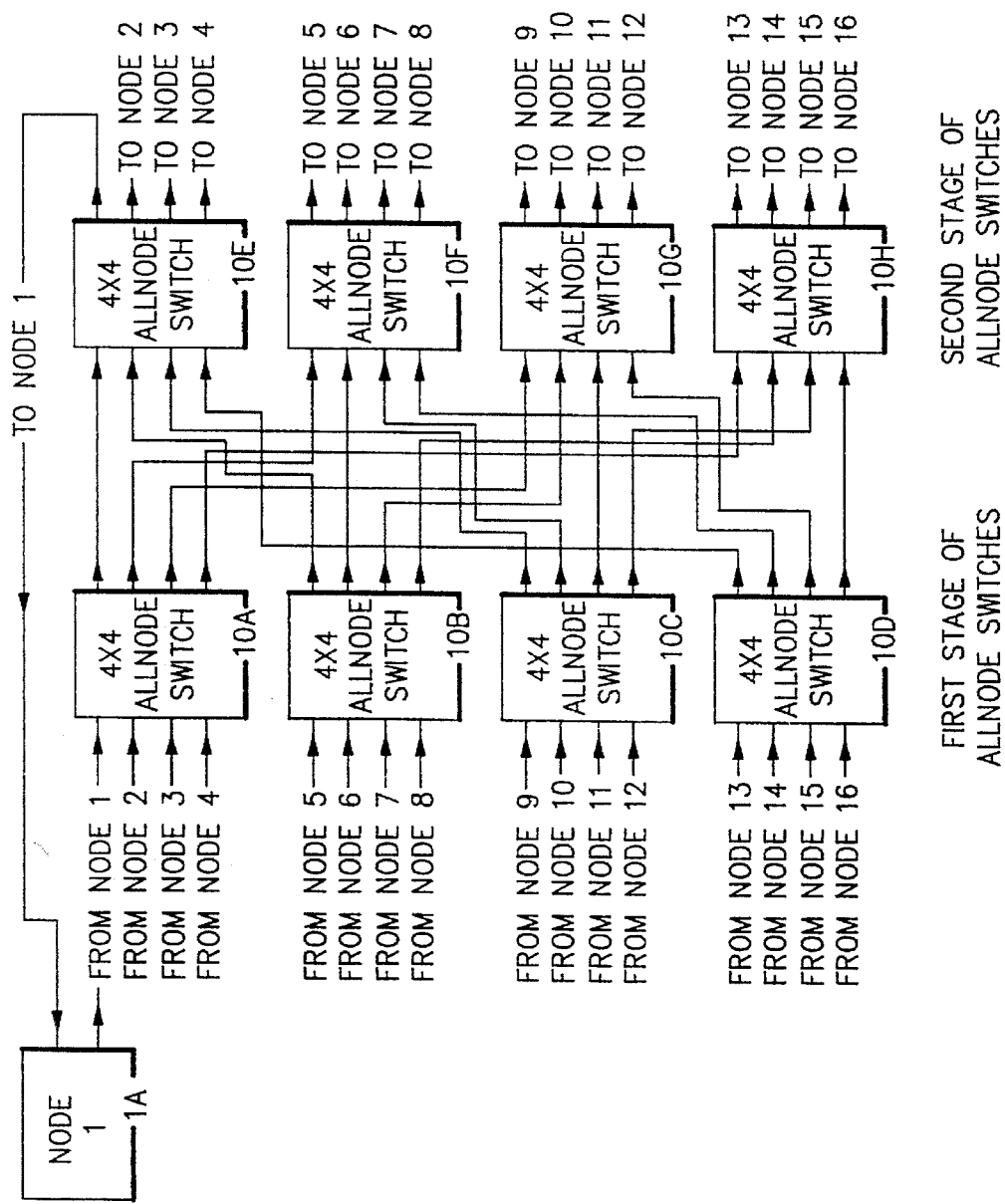
FIG. 4 shows a typical method for cascading the 4×4 disclosed embodiment of the invention switching apparatus to accomodate systems having more than 4 nodes.

Referring to FIG. 4, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner.

Figure 5:
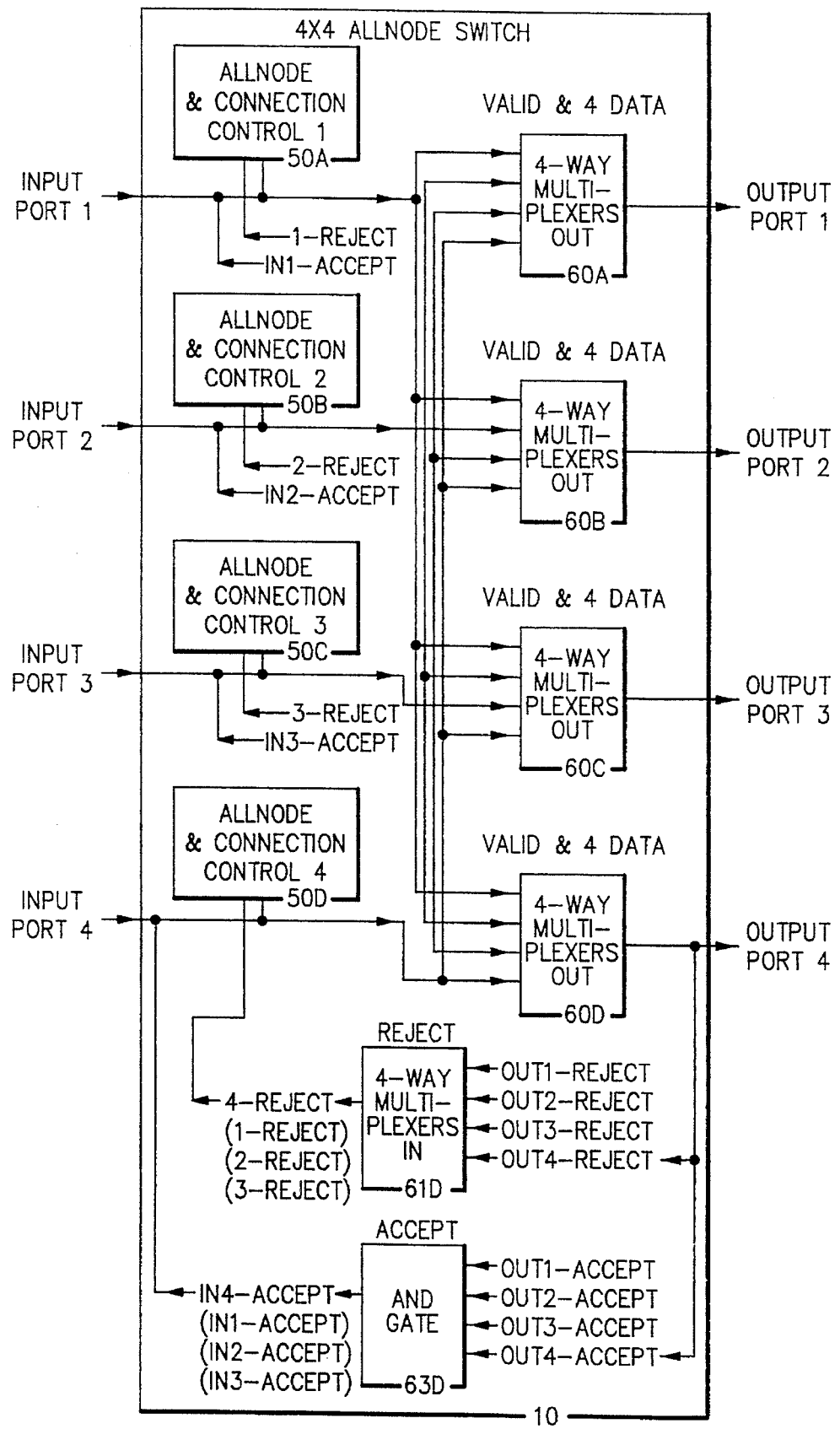
FIG. 5 shows a schematic block diagram of the simple digital data flow and control path implementations of the 4×4 crossbar switching apparatus, which has the capability of being used with the present invention to provide fully parallel switching means for interconnecting up to four system nodes for the purpose of transferring digital data.

Referring to FIG. 5, a functional diagram of the simple data flow across ALLNODE switching apparatus 10 is illustrated. The VALID and four data lines at each input port, inside the switch, and at each output port are represented by a single line in FIG. 5 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 6:
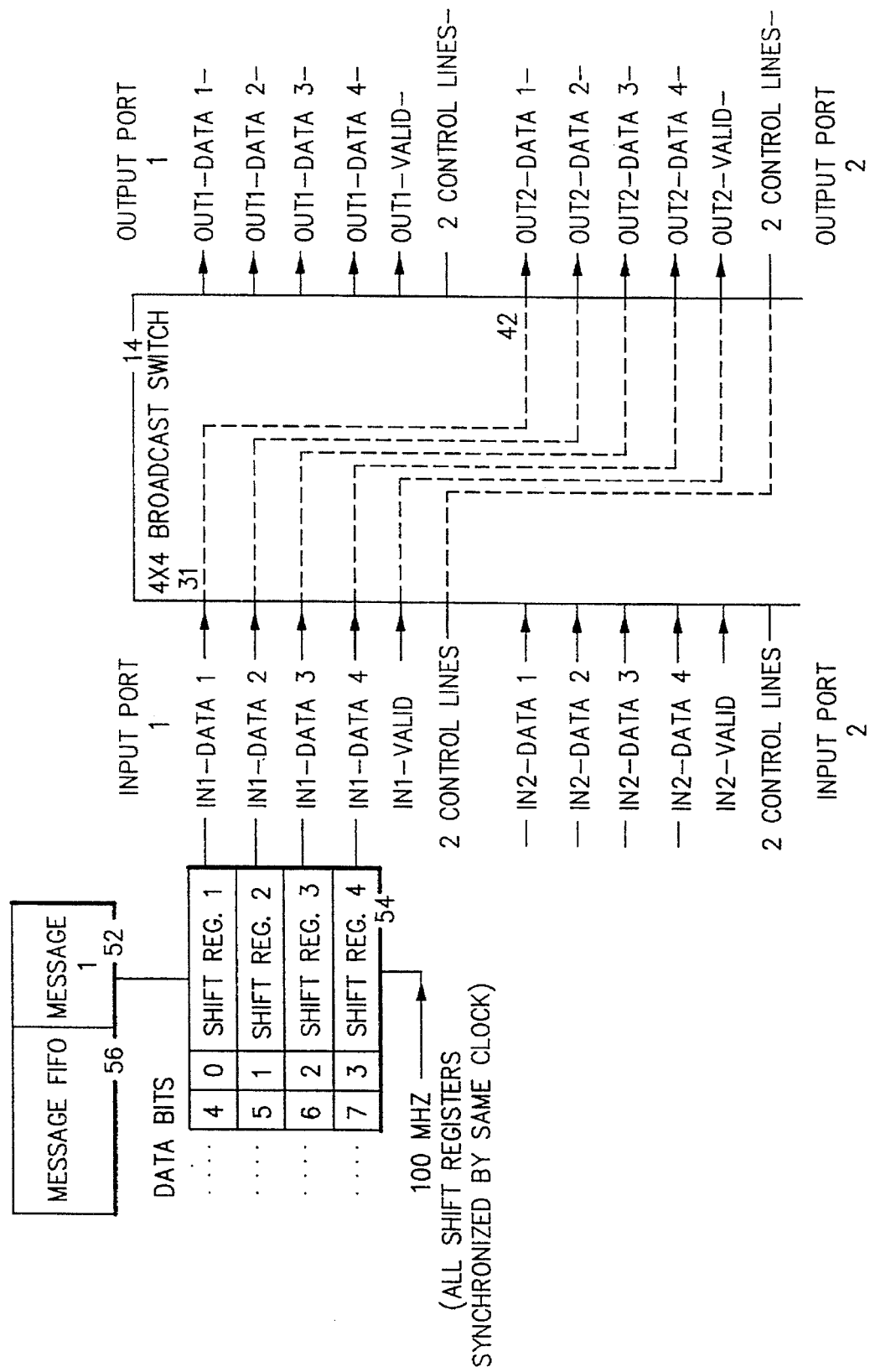
FIG. 6 illustrates a typical method for generating parallel control and multiple line serial digital data information to be sent to the 4×4 prior parent embodiment of the invention switching apparatus over four synchronous data lines.

Referring to FIG. 6, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 6 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 7:
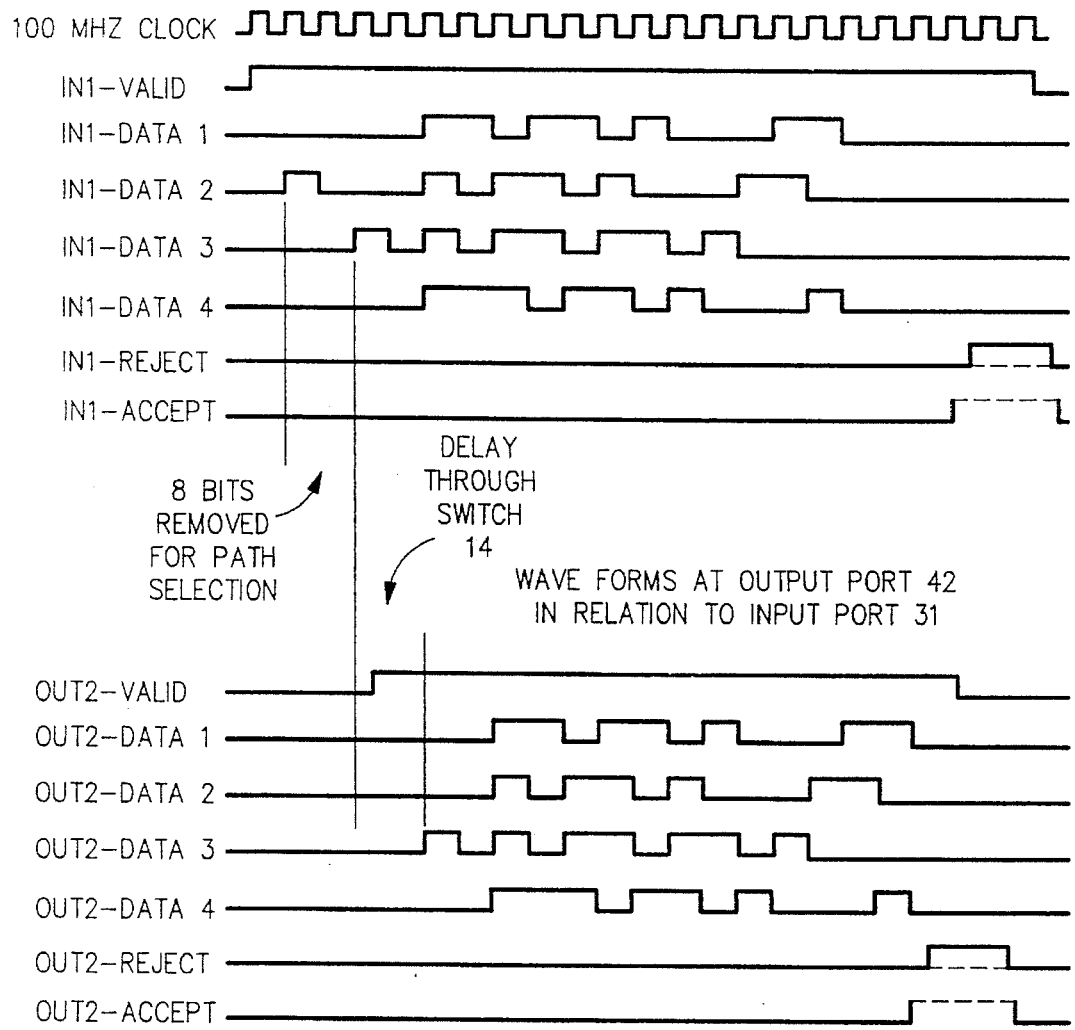
FIG. 7 shows a typical timing diagram for routing the digital interface signals arriving at one input port of the 4×4 prior parent embodiment of the invention switching apparatus to one output port.

Referring to FIG. 7, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 8:
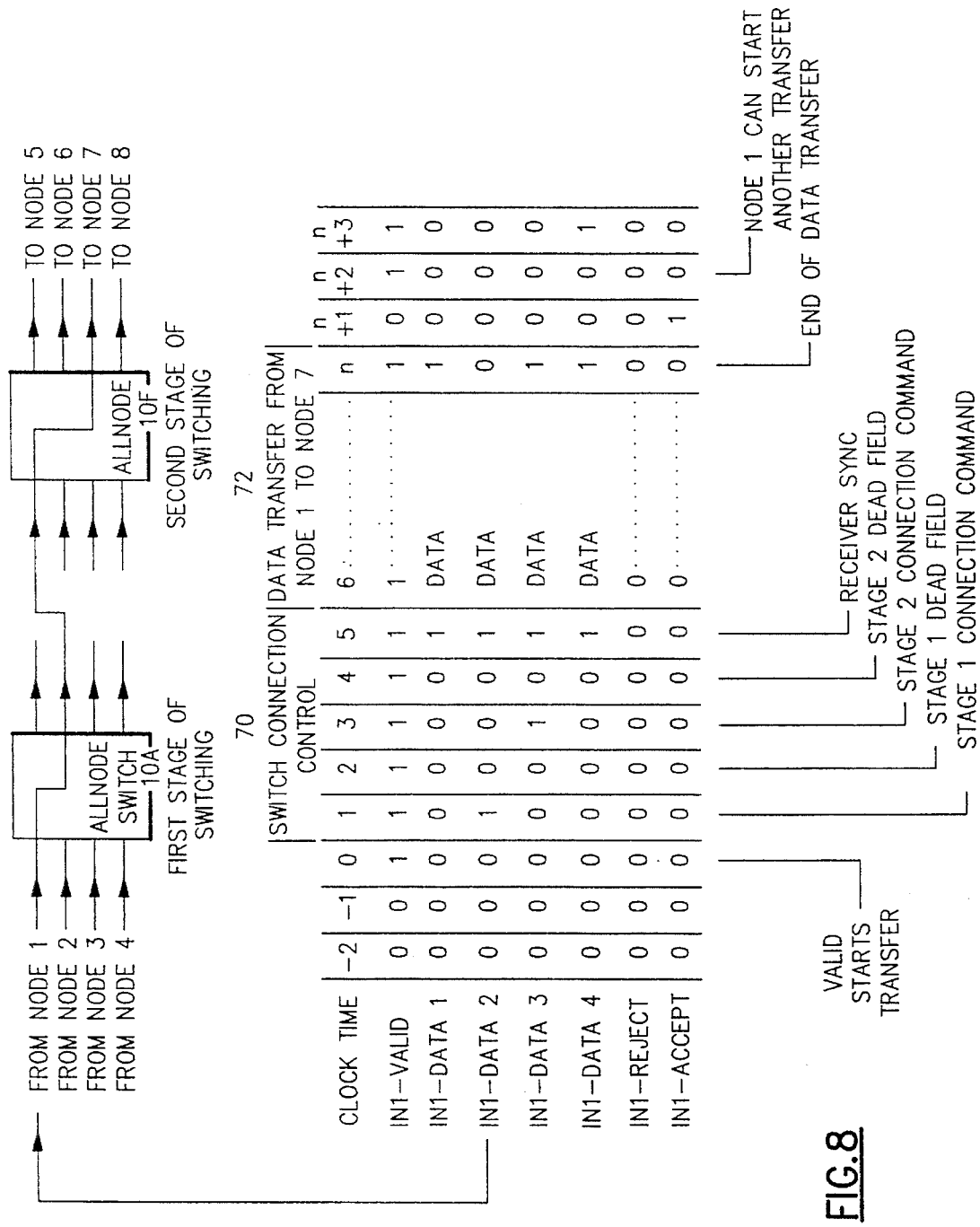
FIG. 8 illustrates the typical method of selecting and establishing a transmission path through a network comprised of the invention switching apparatus for the purpose of sending digital data from one node to another.

Referring to FIG. 8, a typical example of the exact serial bit patterns and control signal activation is shown for sending control and digital data information to switching apparatus 10. The example references the cascaded, two stage switching network shown in FIG. 4 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 4. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port I interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodient, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 6), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Figure 9:
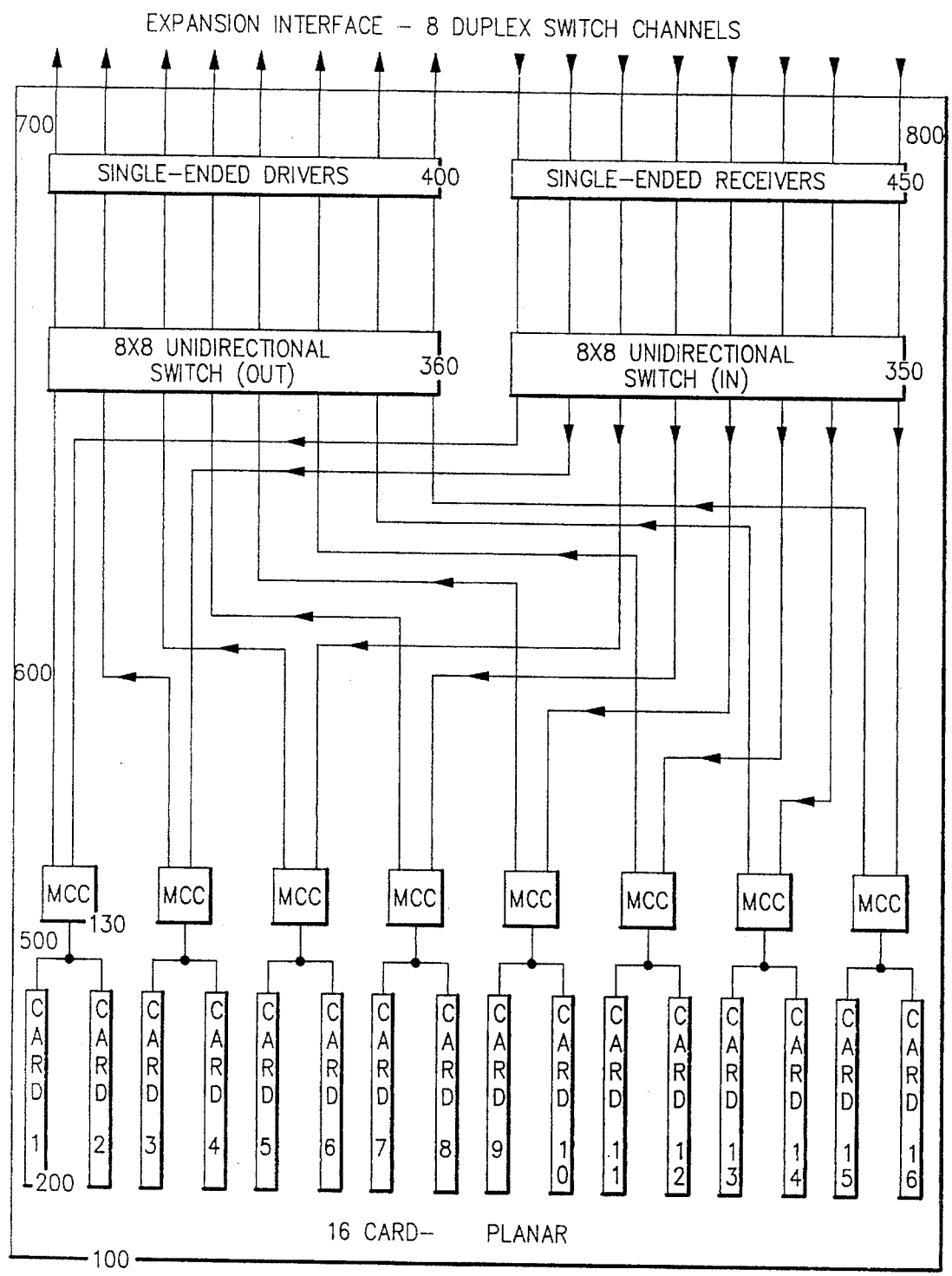
FIG. 9 illustrates a typical physical embodiment of the Switch-based MicroChannel Planar apparatus showing how the switching network is incorporated into the said planar.

Referring to FIG. 9, more details are shown as to the physical layout of the Switch-based MicroChannel Planar. The Switch-based MicroChannel Planar implements 16 MicroChannel card slots 200 organized in group of 2 cards, which form one node or port of the switch network; 8 unique MicroChannel busses 500, each connecting 2 MicroChannel cards per node to a unique MCC function; 8 MicroChannel Converters (MCC's) adapting the 8 Microchannel busses to the Allnode Switch interfaces; two 8×8 Allnode Switch Chips 360 and 350, which form either the entire network 30 function or a part of the network 30 function; and single-ended driver and receiver circuits, which are used to drive and receive the switch interfaces from blocks 360 and 350 through planar connectors 700 and 800, respectively, to communicate and expand to the remainder of switch network 30 which is not implemented as part of a single Switch-based MicroChannel Planar 100. Note that the 8×8 version of the Allnode Switch, as shown in blocks 360 and 350, is a straight forward expansion of the basic 4×4 Allnode switch described herein. The only difference being that the 8×8 switch has 8 input ports and 8 output ports, compared to the 4×4 switch which has 4 input ports and 4 output ports. The 8×8 switch provides complete interconnection capabilities between any input port and all 8 output ports.

Figure 10:
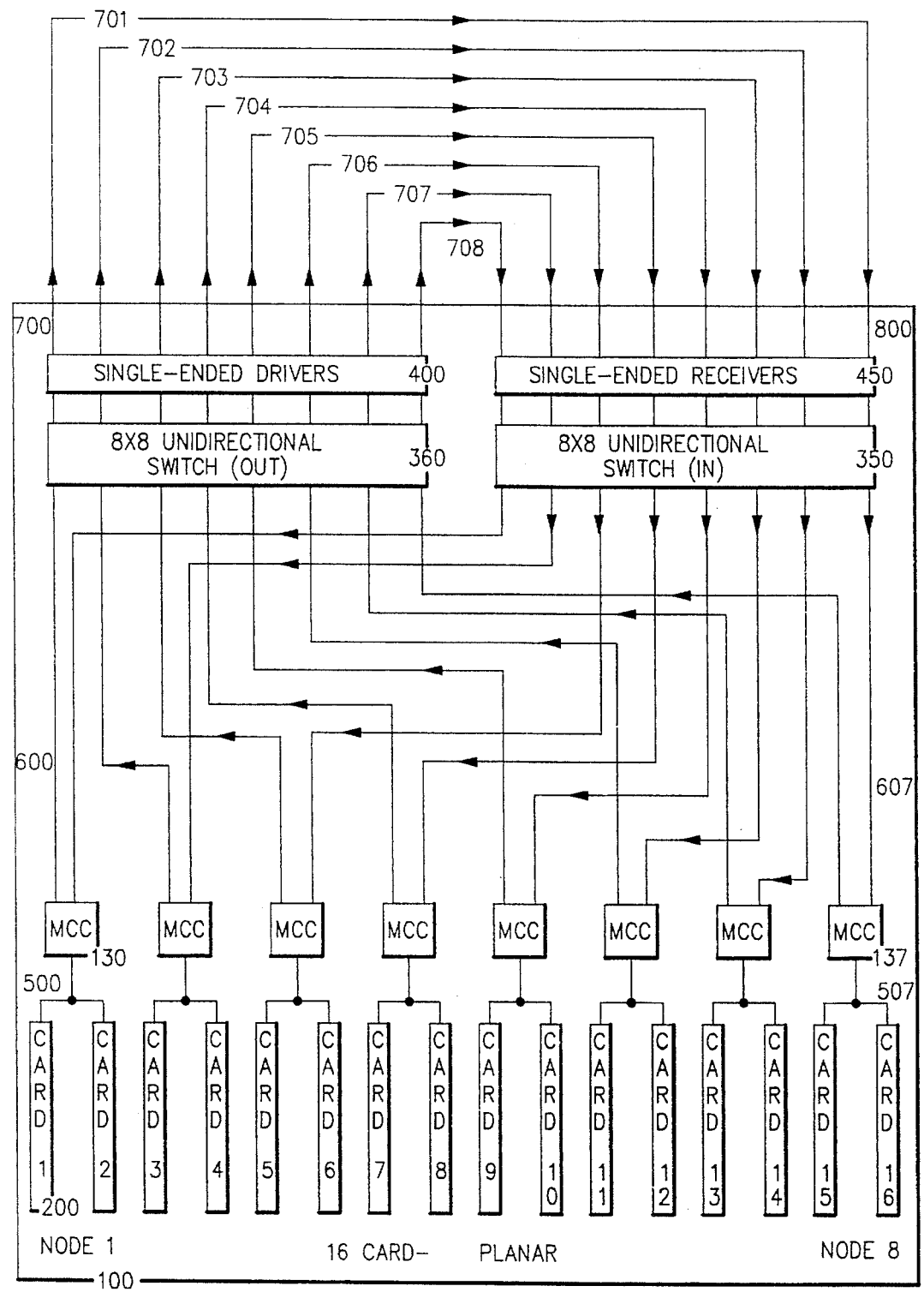
FIG. 10 illustrates the planar interconnections required to interconnect 8 nodes on the Switch-based MicroChannel Planar apparatus as a stand-alone system.

FIG. 10 illustrates the external planar connections 701 to 708, that are required to form the entire 2-stage switch network 30 function and enable a single Switch-based Planar 100 to stand alone as complete 8 node system. In this case switch blocks 360 and 350 form the entire network 30 function, with switch 360 being the first stage of a 2-stage network and switch 350 being the second stage. FIG. 10 shows how the 8 outputs of switch 360 are externally jumpered to the 8 inputs of switch 350 via jumper wires 701 to 708 and drivers 400 and receivers 450. Jumpers 701 to 708 form 8 multi-paths, such that any one of the 8 jumpers can be used as a path by any of the 8 nodes to get to any other of the 8 nodes.

A typical data transfer from one node to another, for instance—node 1 to node 8, would include the following steps. The sending node 1 would communicate to its local microchannel bus 500 using standard microchannel bus sequences. MCC 130 would respond to these sequences and convert them to sequences and protocols which are understood by switch network 30 as communicated over interface 600. Thus, the communication from one of the two MC cards in the first node is passed over MC bus 500 to MCC 130, which converts the communication format and passes it on to the switch network 30. Switch network 30 is commanded by MCC 130 to form a connection to the receiving node 8, causing network 30 to pass the communication to be routed through switch 360 and drivers 400 to switch network output bus 700. The communication make its way through the off-planar portion of the network over anyone of the 8 jumpers 701 to 708, and returns into the planar 100 over switch network input bus 800. The communication data passes through single-end receivers 450 and is routed to the specified receiving node via switch 350 and switch interface 607. The data is then received by MCC 137, converted back into a standard MC format, and passed over microchannel bus 507 to receiving node 8.

Figure 11A:
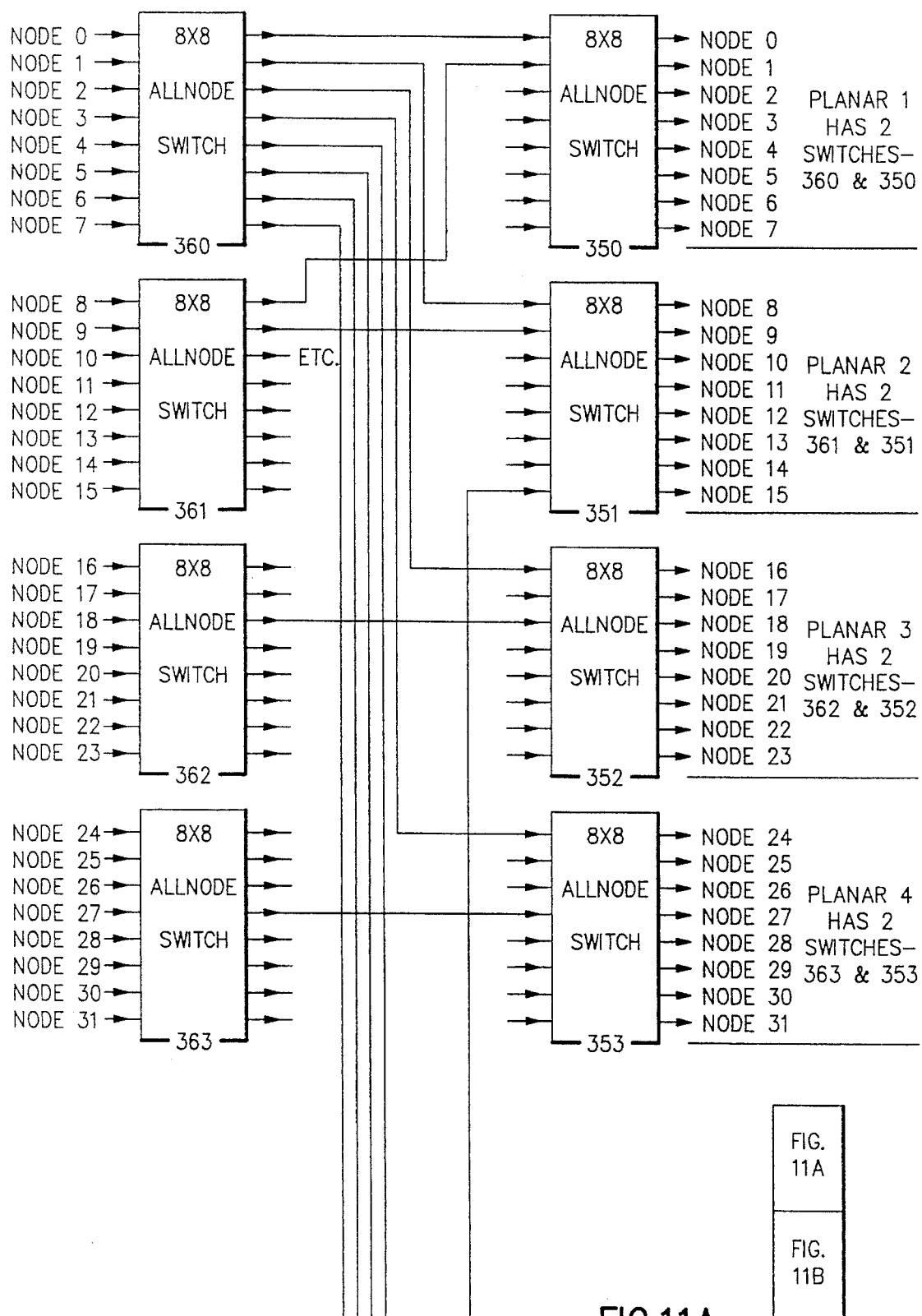
FIG. 11 illustrates how the number of nodes in the system can be expanded above 8 nodes by interconnecting multiple Switch-based MicroChannel Planars, each incorporating a portion of a distributed multistage network capable of interconnecting larger number of nodes.
Figure 11B:
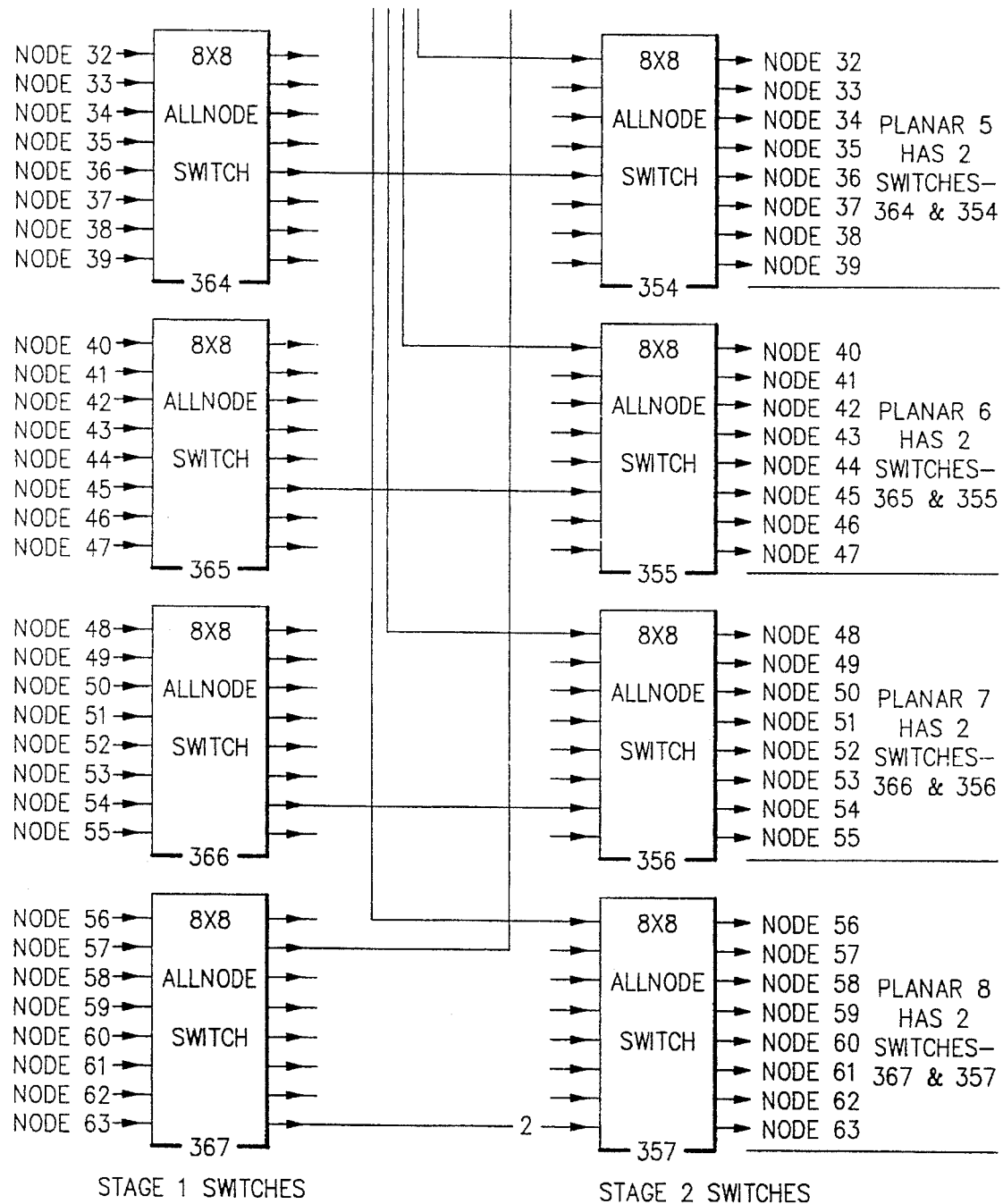

The Switch-based MicroChannel Planar is modular and allows for expandabilty above 8 nodes in either of two ways. The Switch-based MicroChannel Planar concept can be expanded to much larger systems by using mutiple Switch-based MicroChannel Planars. An example of this is shown in FIG. 11, where the interconnection of 8 Switch-based MicroChannel Planars are shown to implement a 64-node system interconnected through two switch stages. In FIG. 11 only the two switch blocks 360 and 350 from each of the 8 planars are shown, since these are the only blocks which have external connections through drivers 400 and receivers 450 (not shown in FIG. 11 for simplicity). These external connections are wired together to form the two stage network. Thus, up to eight indentical Switch-based MicroChannel Planars 100 can be interconnected to provide a 64 node system comprised of 128 microchannel cards interconnected through a switching network totally contained on the eight planars and comprised of 16 switch chips.

Figure 12:
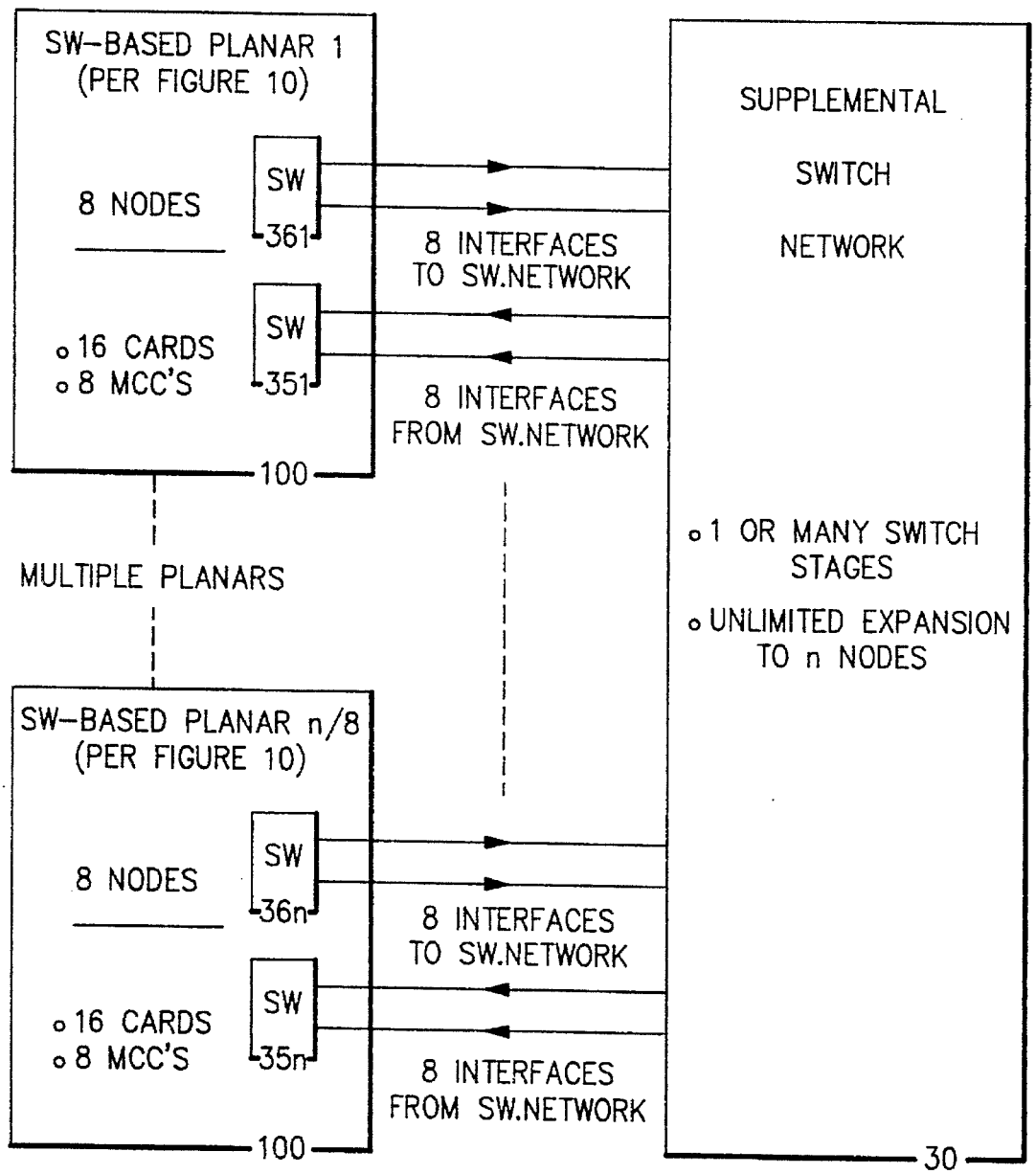
FIG. 12 illustrates how the number of nodes in the system can be expanded above 64 nodes by interconnecting multiple Switch-based MicroChannel Planars to a supplemental switch network, where the entire switch network is distributed across multiple Switch-based MicroChannel Planars and the supplemental switch network.

In addition, additional switching can be implemented completely external to the Switch-based MicroChannel Planars and used to supplement multiple Switch-based MicroChannel Planars, as shown in FIG. 12. It is possible to interconnect more than eight Switch-based MicroChannel Planars together by introducing a supplemental portion of the switch 30 network which is central and not contained on any of the Switch-based MicroChannel Planars. Using this concept the number of nodes and microchannel cards comprising a system can be expanded without theoretical limit.

There are two possible implementations of the MicroChannel Converter (MCC) units—either master or slave. The functional details of these MicroChannel Converter units are detailed in separate concurrently filed applications, "MASTER CONVERTER APPARATUS FOR CONVERTING MICROCHANNEL BUS TO SWITCH ARCHITECTURE" by H. T. Olnowich et al, and "SLAVE CONVERTER APPARATUS FOR CONVERTING MICROCHANNEL BUS TO SWITCH ARCHITECTURE" by H. T. Olnowich et al, are hereby incorporated by reference.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A switch-based, multi-node planar comprising:

a switch interconnection network means for coupling multiple nodes asynchronously through input to output port connections simultaneously;

a plurality of nodes each attached to a bus structure, and capable of configuring elements within the nodes of varying characteristics depending upon the functions implemented by various processor and/or expansion cards within the nodes;

a plurality of pluggable nodal elements capable of transmitting data to said network;

a plurality of pluggable nodal elements capable of receiving data from said network;

multiple bus converter means, each with the capability for adapting the standard bus architecture and protocol for a single multi-drop bus to said switch network architecture and protocol and each with the capability for adapting the switch network architecture and protocol to the standard bus architecture and protocol for a single multi-drop bus;

an expansion interface to said switch network comprising driver and receiver circuits and providing means of interconnecting multiple switch paths external to said planar; and wherein said switching network operates asynchronously in relation to input signals received at each input port, needs no clock input of any kind to perform its control functions of establishing connections, and employs no buffering of data messages of any kind.

2. The apparatus of claim 1 further comprising the connection circuitry for attaching one to eight processor or expansion cards to each bus structure supported by said planar apparatus, wherein each set of said one to eight processor or expansion cards functions as a single node of the system.

3. The apparatus of claim 2, wherein said bus structure routes multi-drop data and control signals amongst said attached set of one to eight processor or expansion cards and said bus converter means internal to said planar apparatus, for the purpose of connecting the bus structure to said switch network to support parallel communication amongst other nodal elements.

4. A switch-based, multi-node planar comprising:

a switch interconnection network means for coupling multiple nodes asynchronously through input to output port connections simultaneously;

a plurality of nodes each attached to an individual multi-drop bus structure, and capable of configuring elements within the nodes of varying characteristics depending upon the functions implemented by various processor and/or expansion cards within the nodes;

a plurality of pluggable nodal elements capable of transmitting data to said network;

a plurality of pluggable nodal elements capable of receiving data from said network;

multiple multi-drop bus architecture converter means, each with the capability for adapting the standard multidrop bus architecture and protocol for a single multi-drop bus multi-drop bus to said switch network architecture and protocol and each with the capability for adapting the switch network architecture and protocol to the standard bus architecture and protocol for a single multi-drop bus; and an expansion interface to said switch network comprising driver and receiver circuits and providing means of interconnecting multiple switch paths external to said planar; and wherein said switching network operates asynchronously in relation to input signals received at each input port, needs no clock input of any kind to perform its control functions of establishing connections, and employs no buffering of data messages of any kind.

5. The apparatus of claim 4 further comprising the connection circuitry for attaching one to eight processor or expansion cards to each individual multi-drop bus structure supported by said planar apparatus, wherein each set of said one to eight processor or expansion cards functions as a single node of the system.

6. The apparatus of claim 4, wherein said bus structure routes multi-drop bus data and control signals amongst said attached set of one to eight processor or expansion cards and said multi-drop bus converter apparatus internal to said planar apparatus, for the purpose of connecting the multi-drop bus structure to said switch network to support parallel communication amongst other nodal elements.

7. A switch-based, multi-node planar comprising:

part of a distributed switch interconnection network means for coupling multiple local nodes asynchronously through input to output port connections simultaneously to communicate to either other local nodes located within said planar or remote nodes located external to said planar;

a plurality of nodes each attached to an individual bus structure, and capable of configuring elements within the nodes of varying characteristics depending upon the functions implemented by various processor and/or expansion cards within the nodes;

a plurality of pluggable nodal elements capable of transmitting data to said network;

a plurality of pluggable nodal elements capable of receiving data from said network;

multiple bus architecture converter means, each with the capability for adapting the bus structure protocol for a single multi-drop bus to said switch network architecture and protocol and each with the capability for adapting the switch network architecture and protocol to the bus structure protocol for a single multi-drop bus;

an expansion interface to said switch network comprising driver and receiver circuits and providing means of interconnecting multiple said planars;

wherein multiple copies of said planar can be interconnected modularly to expand the number of nodal elements supported by the apparatus; and wherein said switching network is implemented across multiple copies of said planar, and the entire said network operates asynchronously in relation to input signals received at each input port, needs no clock input of any kind to perform its control functions of establishing connections, and employs no buffering of data messages of any kind.

8. The apparatus of claim 7 further comprising the connection circuitry for attaching one to eight processor or expansion cards to each bus structure supported by said planar apparatus, wherein each set of said one to eight processor or expansion cards functions as a single node.

9. A switch-based, multi-node planar comprising:

part of a distributed switch interconnection network means for coupling multiple local nodes asynchronously through input to output port connections simultaneously to communicate to either other local nodes located within said planar or remote nodes located external to said planar;

a plurality of nodes each attached to an individual multi-drop bus structure, and capable of configuring elements within the nodes of varying characteristics depending upon the functions implemented by various processor and/or expansion cards within the nodes;

a plurality of pluggable nodal elements capable of transmitting data to said network;

a plurality of pluggable nodal elements capable of receiving data from said network;

multiple multi-drop bus converter means, each with the capability for adapting the multi-drop bus architecture and protocol for a single multi-drop bus to said switch network architecture and protocol and each with the capability for adapting the switch network architecture and protocol to the standard bus architecture and protocol for a single multi-drop bus; and an expansion interface to said switch network comprising driver and receiver circuits and providing means of interconnecting multiple said planars;

wherein multiple copies of said planar can be interconnected modularly to expand the number of nodal elements supported by the apparatus; and wherein said switching network is implemented across multiple copies of said planar, and the entire said network operates asynchronously in relation to input signals received at each input port, needs no clock input of any kind to perform its control functions of establishing connections, and employs no buffering of data messages of any kind.

10. The apparatus of claim 9 further comprising the connection circuitry for attaching one to eight processor or expansion cards to each individual multi-drop bus structure supported by said planar apparatus, wherein each set of said one to eight processor or expansion cards functions as a single node of the system.

11. A switch-based, multi-node planar comprising:

a switch interconnection network means distributed amongst multiple copies of said planar and supplemented by additional switching elements implemented externally to said multiple planars for coupling multiple nodes located on the multiple planars asynchronously through input to output port connections simultaneously;

a plurality of nodes each attached to an individual standard bus structure, and capable of configuring elements within the nodes of varying characteristics depending upon the functions implemented by various processor and/or expansion cards within the nodes;

a plurality of pluggable nodal elements capable of transmitting data to said network;

a plurality of pluggable nodal elements capable of receiving data from said network;

multiple bus architecture converter means, each with the capability for adapting the standard bus architecture and protocol for a single multi-drop bus to said switch network architecture and protocol and each with the capability for adapting the switch network architecture and protocol to the standard bus architecture and protocol for a single multi-drop bus; and an expansion interface to said switch network comprising driver and receiver circuits and providing means of interconnecting multiple said planars and additional switching elements implemented externally to said multiple planars;

wherein multiple copies of said planar can be interconnected modularly to expand the number of nodal elements supported by the apparatus by interconnecting to additional switching elements implemented externally to said multiple planars; and wherein said switching network is implemented across multiple copies of said planar and additional switching elements implemented externally to said multiple planars, and the entire said network operates asynchronously in relation to input signals received at each input port, needs no clock input of any kind to perform its control functions of establishing connections, and employs no buffering of data messages of any kind.

12. A planar apparatus comprising:

a plurality of receptacle means each for coupling to an expansion card or processor card;

bus means for coupling each of the receptacle means to an associated one of a plurality of conversion means, each said conversion means for converting switch protocol data messages to bus protocol data messages and for converting bus protocol data messages to switch protocol data messages, each said conversion means including means for receiving a bus protocol data message over the bus means from an associated expansion card or processor card, means for sending a data message converted to switch protocol to a switch network, means for receiving a switch protocol data message from the switch network, and means for sending a data message converted to bus protocol to an associated expansion card or processor card over the bus means;

said switch network comprising:

a plurality of input ports for receiving a data message converted to switch protocol and a plurality of output ports for sending the data message converted to switch protocol;

connection means for establishing a communication path between any one of the input ports and any one of the output ports in response to a connection request received at said any one of the input ports, said communication path for transmitting a data message converted to switch protocol received at said any one of the input ports to said any one of the output ports, said connection means including asynchronous connection means for establishing asynchronously a plurality of simultaneously active communication paths between a plurality of input ports and a plurality of output ports in response to a plurality of connection requests received separately or simultaneously at said plurality of input ports, said simultaneously active communication paths for transmitting simultaneously a plurality of data messages converted to switch protocol received separately or simultaneously at said plurality of input ports to said plurality of output ports.

* * * * *